Patented Sept. 19, 1950

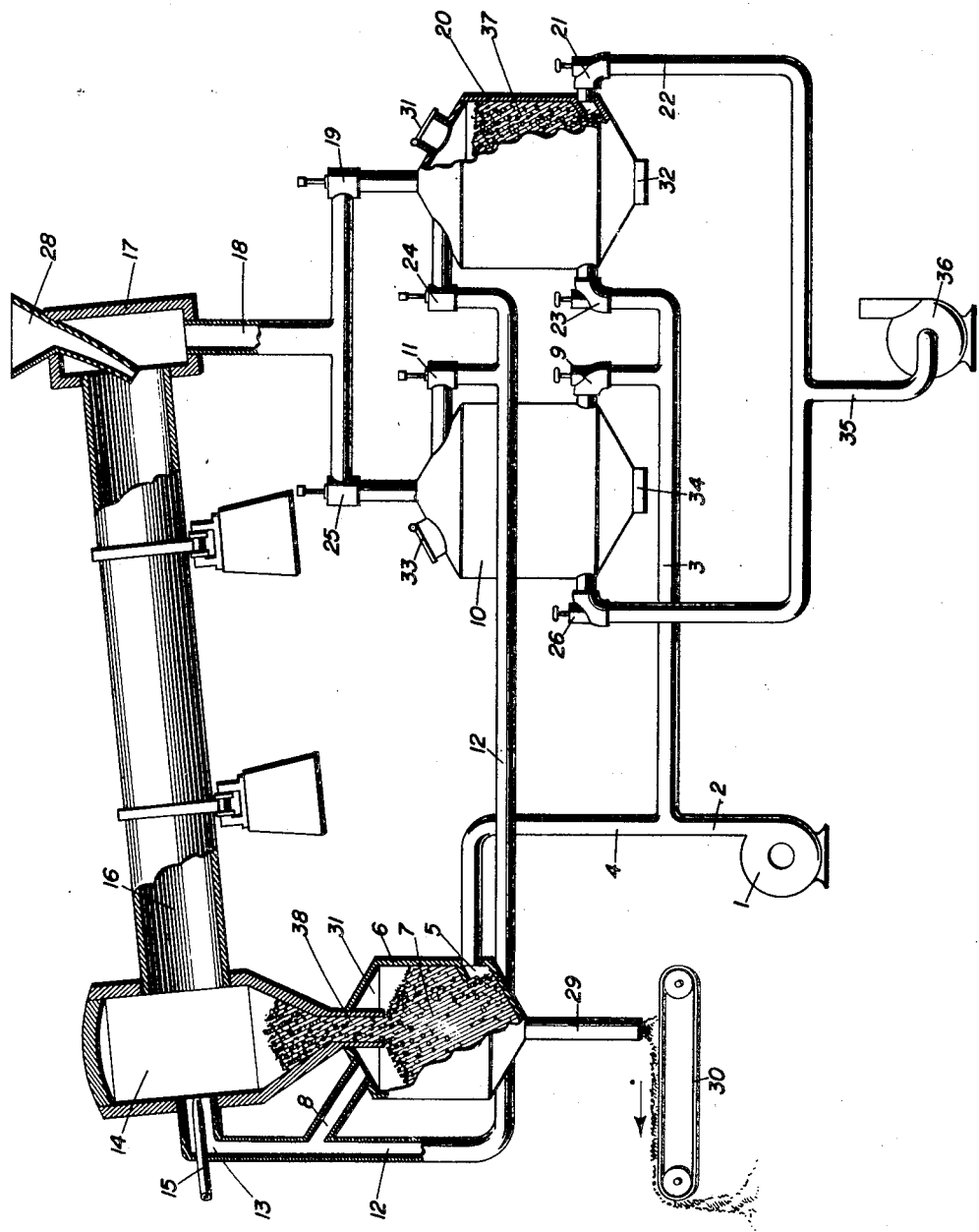

2,522,639

UNITED STATES PATENT OFFICE 2,522,639

PROCESS AND APPARATUS FOR THERMAL TREATMENT OF SOLIDS

Percy H. Royster, Chevy Chase, Md., assignor to Pickands Mather & Co., Cleveland, Ohio, a co-partnership Application October 1, 1946, Serial No. 700,547

2 Claims. (Cl. 263—52)

This invention relates to a process and apparatus for the thermal treatment of solids, with particular reference to the drying, roasting, calcining and agglomerating of minerals at elevated temperatures. The present process is applicable to calcination of limestone and dolomites, the dead-burning of dolomite and magnesite, the roasting of iron, manganese, chromium, and other ores, as well as the magnetic roasting of iron ores and the production of sponge iron. The process is applicable to the activation of Fuller's earth, silica gel, and absorptive alumina, and to the thermal decomposition of such iron salts as ferrous sulphate and pickle-bath residues. In a very important way, the improved process of the present invention is of value in the production of Portland cement clinker and the calcining of gypsum.

An object of the present invention is to provide a thermally efficient procedure for the operation of a rotary kiln.

In the thermal treatment, at elevated temperatures, of the solids and minerals recited above, the rotary kiln, as currently used in burning lime and producing Portland cement, is of considerable technical inconvenience. In particular, its thermal efficiency is quite low. The major cause of the heat loss from a cement kiln is the high temperature at which the gases exhaust from the kiln, and in a secondary way the sensible heat of the hot discharge clinker. It is standard practice, both in burning lime and in producing cement clinker, to discharge the hot product into a rotary kiln wherein a stream of cold atmospheric air effects a partial cooling of the lime or clinker, the heat thus transferred being recovered as preheat of the air used for fuel combustion. Some of the sensible heat of the hot gases discharged from the calcining kiln is customarily recovered by passing said gases through a waste-heat boiler for the generation of steam power used in the plant. The thermal efficiency of the rotary drum is objectionably low, with the result that in practice the cooling of the hot solids passed therefrom is incomplete and concurrently the amount of preheat obtained in the inlet air is somewhat low. The efficiency of the waste-heat boiler is not high, for two reasons: (1) the gas is discharged from the kiln rather objectionably contaminated with fume and impalpable dust which tends to settle on the boiler tubes, thereby impairing its efficiency: and, (2) because of the relatively low temperature of the gases (for instance, as compared with usual steam boiler practice), a very large boiler installation would be necessary to realize satisfactory boiler efficiency. Aside from this, in many practical cases the sensible heat of the discharged gases far exceeds the local needs of the plant for steam power.

The present invention provides a method for recovering the heat of the hot solid product and of the hot exhaust gases in an economically advantageous manner not heretofore proposed or employed. The operation of my improved process and the construction of the necessary apparatus may best be described by recourse to the following specific examples.

The single figure of the drawing illustrates, partly in section and partly diagrammatically, apparatus adapted to the realization of my present invention.

In my present invention, I provide at least two regenerative heat exchangers of the pebble-bed type which I employ to recover the sensible heat of the exhaust gases and to return this heat to the combustion chamber. I also employ the pebble-bed type of heat exchanger in the cooling of the hot discharged solids. The procedure by which these two results are attained will be clearly seen by reference to the drawing.

The motor-driven blower 1 in the drawing forces a stream of atmospheric air into cold blast main 2. This air stream is split into two fractions, the first of which passes through inlet conduit 4 into open inlet space 5 at the bottom of interchanger 6, in which latter a continuously descending mass of hot solids 7 is maintained. The air, after passing upwardly through 7, enters open space 31 from which it discharges through hot-air duct 8 into hot blast main 13. The other fraction of the draft air from blower 1 passes by way of conduit 3 and open inlet valve 9 into the bottom of the pebble-bed type interchanger 10, wherein it is heated. The hot air from 10 passes by way of water-cooled open hot air valve 11 into hot blast conduit 12 which connects with blast main 13 after conjunction with conduit 8 where the hot air from 6 and from 10 commingle. The total pre-heated draft enters combustion zone 14 and serves to effect the combustion of the fuel introduced through fuel burner 15. Hot gaseous products from 14 enter and traverse rotary kiln 16, discharging into exhaust hood 17 as in present practice. The hot gases discharging from this exhaust hood proceed by way of exhaust main 18 and open water-cooled hot-gas valve 19 into the open space within the top of interchanger 20. Interchangers 10 and 20 are conveniently constructed alike. Each contains a mass of pebbles 37, 37, as described in my U. S.

Patent No. 1,940,371 and Reissue No. 19,757, to which reference is herein made. After their downward passage through the pebble bed 37 the cooled gases pass through open chimney valve 21 and are discharged to atmosphere through a chimney (not shown) or, more frequently, through exhaust conduits 22 and 35, from which they are removed by induced-draft vent 36. It is to be understood that stoves 10 and 20 are used alternately, for abstracting heat from the kiln gases and thereafter for pre-heating that portion of the draft air which is diverted thereto. From time to time the directions of flow are reversed, by appropriate manipulation of valves 19, 25, 11, 24, 26, 9, 23 and 21—so that the stove which had served for cooling the exit gases is used for pre-heating blast air while the stove which had served for pre-heating blast air is used for cooling the exit gases. It is a practical convenience so to regulate the operation of fans 1 and 36 as to maintain a minimum leakage of air into the junction between kiln 16 and combustion zone 14 and the junction between kiln 16 and exhaust hood 17.

Example 1

When the production of cement clinker is carried out in the currently conventional apparatus hereinbefore described, it is common to operate a kiln 10 feet in diameter and 240 feet long to produce 252 g. t. (gross tons, 2240 lbs.) of cement clinker (1500 bbls.) per day. In such operation, 24,200 cu. ft./min. of atmospheric air are forced through the cooling drum, from which it will emerge pre-heated to the temperature of 346° F. Powdered coal, at the rate of 121 lbs./min., is forcibly sprayed through the burner into the combustion space wherein it burns with a long flame extending 30 to 40 feet into the rotary kiln per se. The temperature of the gases entering the lower end of the rotary kiln may be, say, 3122° F. Heat is exchanged between the gaseous products moving through the rotary kiln and the solids moving therein, in the classical counter-current method, but with very low efficiency. Of the 1,718,000 B. t. u./min. of sensible heat entering the kiln, 317,500 B. t. u./min. are absorbed in the calcination of the basic carbonates in the charge. The kiln is lined with firebrick 6 in. thick, and 280,000 B. t. u./min. are lost by conduction through this brick. The cement clinker discharging from the kiln into the cooling drum carries away 250,000 B. t. u./min., and 870,000 B. t. u./min. are carried away by the gases discharging at 1570° F. into the exhaust. Of the 1,586,000 B. t. u./min. low calorific value of the fuel produced, 51% is carried away as hot exhaust gases, 14.7% as hot clinker, and 16.5% as brick conduction heat loss. It has been found in practice that little if anything is gained by improving the insulation of the kiln, since the heat thus saved merely discharges into the exhaust hood as hot gas. It is important to emphasize this here, since with the improved recovery of the heat from the exhaust gases in my present process substantial saving in fuel consumption can be and is effected by improved thermal insulation of the rotary kiln, this improved insulation being an important feature of my process.

It is observed that in the production of cement clinker the only essential thermal requirement is the removal of $CO_2$ from the basic carbonates in the charge, since in an ideal operation the clinker will be discharged at atmospheric temperature and the gaseous products will be also discharged cold.

In the above example of current practice it is observed that only 18.5% of the heat used is absorbed in removing $CO_2$, and the true thermal efficiency is therefore that figure—18.5% thermal efficiency. It is true that, where steam power is in demand, heat recovered in the waste heat boiler can be considered a thermal credit to the furnace. Considered, however, only as a kiln, the efficiency seldom exceeds 20%.

In carrying out the above described operation according to the principles of the present process, I employ in the kiln 16 a lining consisting of an inner course of firebrick 9 in. radial thickness surrounded by a 9 in. course of insulating brick, with the result that the heat lost through the refractory lining is only 30,000 B. t. u./min. compared with the 280,000 B. t. u./min with a conventionally lined kiln.

Kiln 16 discharges 386 lbs./min. of clinker at 2600° F. through refractory duct 38 to maintain the stockline of the clinker-bed 7 within interchanger 6 at a constant level. The stockline or upper free surface of 7 is conical with its surface inclined to the horizontal at the angle of free repose exhibited by the clinker.

Of the 26,500 cubic feet per minute of air discharged through duct 2 by blower 1, 3900 cu. ft. traverses duct 4 and enters annular space 5 at the bottom of interchanger 6. In its passage upwardly through bed 7 this stream of air is heated to 2560° F., and flows through duct 8 carrying 400,000 B. t. u./min. into hot blast main 13. The major portion of the air from duct 2, viz., 23,600 cu. ft., flows through cold blast main 3, and open cold blast valve 9, into the bottom of interchanger 10. In its upward passage through pebble-bed 37 retained within interchanger 10 (not shown) the air is heated to 1950° F. This pre-heated air discharging through open, water-cooled hot-air, valve 11, flows through hot blast main 12 into main 13 carrying 882,000 B. t. u./min. When the streams of air from ducts 8 and 12 commingle, the temperature of the resulting 26,500 cu. ft./min. is 1920° F., thus returning some one million B. t. u./min.

When using powdered coal, in order to maintain the required thermal conditions in the kiln, I burn 54 lbs./min. of powdered coal having a calorific value of 17,800 B. t. u./min. The total thermal input to combustion chamber 14 is 1,718,000 B. t. u./min., which is the same heat supply as given in the above described operation of the standard cement kiln.

It is noted that the fuel consumption in my process, in this example, is 39 tons of coal per day, which should be compared with the 88 tons of the same coal per day required in present-day practice. This saving in fuel consumption is the primary object of the present invention.

In many calcining operations in the rotary kiln, particularly in the case of Portland cement, the discharged gases constitute a serious public nuisance. It is an advantage in this respect that considerable fume and dust are collected in the pebble beds 37, 37 within interchangers 10 and 20. In cement practice, the entrapped dust is high in soluble potash salts, wielding a valuable chemical by-product. A Cottrell precipitator may, with advantage, be interposed in the exhaust from induced fan 36 to remove objectionable residual dust. Because of the lower dust content in my process, and because of the lower exhaust temperature, the size and cost of the precipitator is substantially less than in current practice.

In operating with highly contaminated gases it is desirable frequently to remove the refractory particles constituting beds 37, 37. Discharge ports 34 and 32 are provided at the bottom of interchangers 10 and 20, respectively, to facilitate the removal of beds 37, 37 when excessive accumulation of dust seriously impairs the heat-exchanging efficiency of these beds. Clean beds of refractory particles are introduced through openable ports 33, 31 positioned in the tops of stoves 10 and 20, respectively.

*Example 2*

A roasting process of considerable industrial importance is encountered in the working up of certain manganiferous carbonate ores found in some abundance in the Dakotas. The analysis of such an ore is: MnO 20.8; FeO 14.4; CaO 7.2; MgO 3.7; $P_2O_5$ 0.6; $CO_2$ 30.6; $SiO_2$ 8.4; $Al_2O_3$ 2.8; and $H_2O$ 11.5.

Using the same size kiln illustrated in Example 1, I roast 1240 g. t. per day of this raw ore to produce 800 g. t. per day of a concentrate analyzing 24.9% Mn and 17.2% Fe. In order merely to free the carbonates of $CO_2$ I find it satisfactory to roast at 1800° F. In the case of ores carrying considerable amounts of fines I prefer frequently to raise the roasting temperature to 2100° F. and above to produce a restricted amount of incipient fusion, whereby to effect nodulization or agglomeration of the fines with the larger lumps, and produce a product of greater metallurgical value. In order to prevent the product from picking up moisture from the air in subsequent handling, a certain amount of semi-fusion is desirable in order to glaze the surface of the nodules.

In carrying out this "roasting" operation, the operative steps are similar to those described in Example 1. Blower 1 delivers 31,000 cu. ft./min. of air into conduit 2. Forty-two percent of this is diverted into 4 as "primary air" and forced upwardly through chamber 6, wherein it attains a primary pre-heat temperature of 2020° F. The remaining fraction of the air (18,000 cu ft./min.) is routed through conduit 3, as "secondary air," and forced upwardly through regenerators 10 and 20, alternately, with 20-minute reversals. In passing through 10 (or 20) the secondary air is pre-heated to 1020° F., and is transferred by way of hot blast main 12 to admix in conduit 13, with the 13,000 cu. ft./min. of primary air entering from 8 to 2020° F. After admixture, the total volume of air exhibits a temperature of 1470° F., thereby returning to combustion chamber 14 some 862,000 B. T. U./min. Of the total return heat (the primary purpose of the present process) 63% is supplied by chamber 6, although only 42% of the air is received from this chamber. Finely divided char, produced by the carbonization of North Dakota lignite, is ejected through fuel burner 14, and is burned in the pre-heated air to release 920,000 B. T. U./min. The total heat supplied to chamber 14 is 1,782,000 B. T. U./min., of which almost one-half (48.2%) is derived from the pre-heated air, after passage through heat exchangers 6 and 10 (or 20).

The products of combustion pass through kiln 16, effecting removal of $H_2O$, $CO_2$ and causing oxidation of the manganous and ferrous oxides of the ore. The volume of gas exhausting from 16 into hood 17 is 39,500 standard cu. ft./min., the temperature is 1040° F., and its analysis is: $CO_2$ 17.7%; $H_2O$ 12.3%; $O_2$ 8.8%; and $N_2$ 61.2%. This exhaust gas discharges into regenerator 20 (or 10) and carries 787,000 B. t. u./min. into the pebble beds 37, 37. The limited amount of secondary air (18,000 cu. ft./min.) can, however, remove an average of only 322,000 B. t. u./min.—its sensible heat when pre-heated to 1020° F. It is nevertheless technically desirable to give chamber 6 first choice in diverting the air into "primary" and "secondary," in spite of the fact that an average of 390,000 B. t. u./min. is lost through chimney valves 21 (or 9) through the fact that the gas is discharged from the bottom of regenerators 20 (or 10) at 540° F. Although the ratio of primary to secondary air given here is preferred, variations in this ratio do not, in every case, seriously affect the thermal efficiency.

*Example 3*

An important application of my presently invented process is concerned with the agglomeration or "nodulizing" of iron ore. I will illustrate with the case of an off-grade iron ore having the following analysis: Fe 49.0%; $SiO_2$ 10.5%; $Al_2O_3$ 3.5%; combined water 3.3%, and moisture 10.85%. This is a hematitic Lake ore of non-shipping grade, high in fines and somewhat fragile. It can be converted into a shipping grade by heating to above 2000° F., up-grading to 54% Fe and subjecting the material to incipient fusion to form mechanically strong nodules.

I carry out agglomeration in a conventional rotary kiln 12 ft. in diameter and 250 ft. long. I charge into the kiln 1870 gross tons per day of the raw ore and remove 1600 g. t. of finished product. Blower 1 forces 27,000 cu. ft. per minute of atmospheric air upwardly through chamber 6, wherein it is pre-heated to 2220° F. by contact with the bed of hot solids descending through this chamber. Blower 1, in addition, forces 57,000 cu. ft. of air per minute alternately at 40-minute intervals through one of the two regenerators 10 and 20 wherein the air is pre-heated to 1620° F. The "primary air" from chamber 6 and the "secondary air" from regenerator 10 (or 20) are commingled and forced into combustion chamber 14 where it functions to support the combustion of 13.7 gallons per minute of fuel-oil introduced through burner 15. The hot products of combustion pass through the kiln and impart about 46% of its sensible heat to the ore passing through the kiln by counter-current heat transfer. Gas discharges from the upper end of the kiln at 1640° F. This hot exhaust gas is conducted alternately into one and the other of the pair of regenerators 10 and 20 (through which the secondary air is not, at the time, passing).

It should be noted that, of the total 84,000 cu. ft. of air per minute from blower 1, the 32% diverted through chamber 6 (primary air) was selected as the volume of air having substantially the same heat capacity as the 2470 lbs. per minute of hot calcined ore descending through chamber 6. The ore is discharged from the lower end of the kiln at 2260° F. and the primary air is returned to the combustion zone pre-heated to 2220° F. If a greater volume of primary air were used, the temperature of primary pre-heat would fall below 2200° F. If less primary air were used, the temperature of the ore discharging from the bottom of chamber 6 would rise above atmospheric to an objectionable extent. It is a fundamental feature of the present process that such a fraction of the total air from blower 1 should be diverted from conduit 2 and used as primary air that the heat capacity of the primary air shall approximate the heat capacity of the ore passing through chamber 6. The remaining fraction (secondary air) is passed through one of the two (or more) regenerators 10 and 20. The volume of the secondary air is, of necessity, less than the volume of the products of combustion downwardly passing through these regenerators. As a result of this, more heat is introduced into the top of regenerators 10 and 20 than is removed therefrom by the secondary air passing upwardly therethrough. As a result, the exhaust gases will not be cooled to atmospheric temperature, no matter how high an efficiency of heat-exchange the regenerators may exhibit. In the present case, the gases discharging through chimney valves 26 (or 21) will average about 600° F.

It should be noted that, of the total heat discharged from the kiln (4,090,000 B. t. u./min.), only 31% is represented by the sensible heat of the hot discharged ore (1,280,000 B. t. u./min.), and that 69% is delivered to the pair of regenerators 10 and 20 by the hot exhaust gas. The total heat returned to the combustion zone in the form of pre-heated air is 75% of the heat discharged (3,100,000 B. t. u.), but 38% of this is recovered in chamber 6. The temperature of the primary pre-heat is, in every case, higher than the temperature of the secondary pre-heat and, therefore, fuel efficiency is promoted by diverting to the primary pre-heater a maximum fraction of the total air without loss of pre-heat temperature.

In general, the exact division of the inflowing draft air from blower 1 into the two fractions (1) "primary" draft flowing into interchanger 6 through conduit 4, and (2) "secondary" draft flowing through cold blast main 3 and stoves 10 and 20 alternately, cannot be definitely specified, since this proportioning will depend upon the composition of the raw feed, the magnitude of the reactions taking place during roasting, and the temperature to which the solid feed is heated in the kiln.

I claim:

1. In the process of heat-treating initially substantially unheated solids at elevated temperatures in a fuel-fired rotary kiln, the improvements which consist in continuously discharging the resulting hot heat-treated solids from the kiln into a refractory lined stationary cooling chamber to form therein a bed of solids extending across the horizontal section of said chamber and of substantial height, continuously withdrawing solids from the bottom of said bed at a rate controlled to maintain the bed at substantially constant height, pre-heating a portion of the air required for combustion of said fuel by forcing the same upwardly through said bed to cool said solids and simultaneously to pre-heat said air, said portion being so controlled in amount that its heat capacity substantially equals the heat capacity of the solids contacted therewith, passing the exhaust gases exiting from the kiln through the colder of a pair of similar, refractory lined, regenerative pebble beds to cool said gases and simultaneously to heat said pebbles, discharging the cooled gases to atmosphere, simultaneously pre-heating the remaining portion of the required combustion air by forcing the same through the hotter of said pair of pebble beds to cool said pebbles and simultaneously to pre-heat said air, reuniting the two portions of pre-heated combustion air, burning said fuel in said combustion air, and passing the resulting hot gaseous products of combustion through said kiln.

2. The process of heat-treating solids at elevated temperatures which comprises charging initially substantially unheated particles of solids into the upper end of an elongated refractory lined rotary kiln axially inclined to the horizontal, maintaining therein combustion of a fuel introduced at the low end of the kiln, supporting combustion of the fuel with pre-heated air, discharging the highly heated solid particles from the kiln into a refractory lined, stationary cooling chamber to form an extended bed of particles therein, withdrawing solids from a lower position in the chamber at a controlled rate whereby to maintain said bed as a coherent mass of particles extending across the horizontal sections of the cooling chamber, forcing air upwardly through said bed in quantity sufficient to cool the solids and preheat the air by countercurrent heat exchange therebetween and conducting the pre-heated air to the lower end of the kiln to react with the fuel introduced therein, passing the gaseous products of fuel combustion from the upper end of the kiln after transit therethrough, through the cooler one of a pair of refractory filled regenerative heat exchangers whereby to cool the gases and heat the refractory filling of the regenerators, discharging the so-cooled gases therefrom to atmosphere, forcing air through the hotter of the pair of regenerators whereby to cool the refractory filling and pre-heat the air, and conducting the pre-heated air from the latter regenerator to the lower end of the kiln to commingle with the fuel introduced therein, whereby to support said combustion thereof.

PERCY H. ROYSTER.

REFERENCES CITED

The following references are of record in the file of this patent:

UNITED STATES PATENTS

| Number | Name | Date |
|---|---|---|
| 928,512 | Eldred | July 20, 1909 |
| 968,313 | Baker | Aug. 23, 1910 |
| 1,043,901 | Bruhn | Nov. 12, 1912 |
| 1,605,279 | Pike | Nov. 2, 1926 |
| 1,759,916 | Riley | May 27, 1930 |
| 2,121,733 | Cottrell | June 21, 1938 |